US009129110B1

(12) United States Patent
Mason et al.

(10) Patent No.: US 9,129,110 B1
(45) Date of Patent: *Sep. 8, 2015

(54) CLASSIFYING COMPUTER FILES AS MALWARE OR WHITEWARE

(71) Applicant: The United States of America, as represented by the Secretary of the Air Force, Washington, DC (US)

(72) Inventors: Mark L. Mason, San Antonio, TX (US); Ming-Shih Wong, San Antonio, TX (US); Jeffrey A. Rhines, Adkins, TX (US); Josh Mitchell, San Antonio, TX (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/042,592

(22) Filed: Sep. 30, 2013

Related U.S. Application Data

(63) Continuation-in-part of application No. 13/007,265, filed on Jan. 14, 2011, now Pat. No. 8,549,647.

(51) Int. Cl.
*G06F 21/56* (2013.01)
*G06F 21/57* (2013.01)

(52) U.S. Cl.
CPC ............ *G06F 21/562* (2013.01); *G06F 21/566* (2013.01); *G06F 21/577* (2013.01); *G06F 2221/033* (2013.01)

(58) Field of Classification Search
None
See application file for complete search history.

(56) References Cited

U.S. PATENT DOCUMENTS

| 6,161,130 | A | 12/2000 | Horvitz et al. |
| 6,907,430 | B2 * | 6/2005 | Chong et al. ................ 726/23 |
| 7,487,544 | B2 | 2/2009 | Schultz et al. |
| 7,577,993 | B2 * | 8/2009 | Roychowdhary et al. ...... 726/22 |
| 8,161,548 | B1 * | 4/2012 | Wan ................................. 726/22 |
| 2003/0065926 | A1 * | 4/2003 | Schultz et al. ................ 713/188 |
| 2009/0013405 | A1 * | 1/2009 | Schipka ........................ 726/22 |

OTHER PUBLICATIONS

Adebayo, Olawale S., et al., "Malware Detection, Supportive Software Agents and Its Classification Schemes," International Journal of Network Security & Its Applications (IJNSA), vol. 4, No. 6 (Nov. 2012).
Schultz, M. G. et al., "Data Mining Methods for Detection of New Malicious Executables," IEEE Symposium on Security and Privacy (S&P), pp. 38-49 (2001).
Hnatiw, Nick et al., "Pimp My PE: Parsing Malicious and Malformed Executables," Virus Bulletin Conference (Sep. 19, 2007).
Shafiq, M. Zubair et al., "PE-Miner: Mining Structural Information to Detect Malicious Executables in Realtime," Recent Advances in Intrusion Detection, vol. 5758, pp. 121-141 (2009).

(Continued)

*Primary Examiner* — Gilberto Barron, Jr.
*Assistant Examiner* — Abdulhakim Nobahar
(74) *Attorney, Agent, or Firm* — AFMCLO/JAZ; Fredric Sinder

(57) ABSTRACT

An improved approach for classifying computer files as malicious (malware) or benign (whiteware) is disclosed. The invention classifies any computer file as malware or whiteware after using Bayes Theorem to evaluate each observable feature of each file with respect to other observable features of the same computer file with reference to statistical information gathered from repositories of known whiteware and malware files.

18 Claims, 5 Drawing Sheets

(56) References Cited

OTHER PUBLICATIONS

Tevis, Jay-Evan J. et al., "Static Analysis of Anomalies and Security Vulnerabilities in Executable Files," ACM SE'06 (Mar. 10-12, 2006).
Perdisci, R. et al., "McBoost: Boosting Scalability in Malware Collection and Analysis Using Statistical Classification of Executables," Annual Computer Security Applications Conference (ACSAC), IEEE Press, pp. 301-310 (2008).
Kolter, M.A. et al., "Learning to Detect Malicious Executables in the Wild," International Conference on Knowledge Discovery and Data Mining (KDD), pp. 470-478 (2004).
Tabish, S. Momina et al., "Malware Detection Using Statistical Analysis of Byte-Level File Content," International Conference on Knowledge Discovery and Data Mining Proceedings of the ACM SIGKDD Workshop on CyberSecurity and Intelligence Infomatics, pp. 23-31 (2009).
Choi, Yang-Seo et al., "Encoded Executable File Detection Technique via Executable File Header Analysis," International Journal of Hybrid Information Technology, vol. 2, No. 2, (Apr. 2009).
Li, Wei-Jen et al., "Information Assurance Workshop, 2005. IAW '05," Proceedings from the Sixth Annual IEEC SMC, pp. 64-71, Jun. 15-17, 2005 Journal in Computer Virology, 2(3) (2006).
Reddy, D. K. S. et al., "N-Gram Analysis for Computer Virus Detection," Journal in Computer Virology, 2(3) (2006).
Wikipedia, "Bayesian Inference," http://en.wikipedia.org/wiki/Bayesian_inference [accessed Mar. 10, 2011].
Wikipedia, "Naive Bayes Classifier," http://en.wikipedia.org/wiki/Naive_Bayes_classifier [accessed Mar. 10, 2011].
Ero Carrera, "pefile Documentation, version 1.2.6," http://dkbza.org/pefile/pefile.html [accessed Mar. 10, 2011].
Pietrek, Matt, "An In-Depth Look into the Win32 Portable Executable File Format, Part 2," MSDN Magazine (Mar. 2002).
Pietrek, Matt, "An In-Depth Look into the Win32 Portable Executable File Format, Part 1," MSDN Magazine (Feb. 2002).
A-V Comparatives E.V., "Anti-Virus Comparative Proactive/Retrospective Test," (Jun. 2010).

\* cited by examiner

```
//
// Initialize Malware Belief
//
230     P(M) = 0.5
//
240     // Main Loop. 1 Iteration per Observable, O
//
        For each O do:
        {
                //
                // Solve Bayes Theorem
                //
250             $P(M \mid O) = \dfrac{1}{1 + \dfrac{P(O \mid W)\,(1-P(M))}{P(O \mid M)\,P(M))}}$
                //
                // Reset Prior Belief
                //
260             P(M) = P(M|O)
                //
                // Test Belief against Convergence Criteria
                //
270             If P(M) > 1 - ε or P(M) < ε:
                        //
                        // Break out of Main Loop
                        //
                        break
        }
        //
        // Final Solution for Malware Belief
        //
280     $P(M)_{Final}$ = P(M)
```

*Fig. 2*

CLASSIFYING COMPUTER FILES AS MALWARE OR WHITEWARE

CROSS-REFERENCE TO RELATED APPLICATIONS

This application is a continuation-in-part and claims priority from U.S. patent application Ser. No. 13/007,265, filed Jan. 14, 2011, titled "Classifying Portable Executable Files as Malware or Whiteware," now U.S. Pat. No. 8,549,647. The specification of U.S. patent application Ser. No. 13/007,265 is incorporated by reference into this description.

RIGHTS OF THE GOVERNMENT

The invention described herein may be manufactured and used by or for the Government of the United States for all governmental purposes without the payment of any royalty.

BACKGROUND OF THE INVENTION

The present invention relates to categorizing computer files as malicious (malware) or benign (whiteware), and more particularly to the use of Bayesian statistical methods to classify such computer files.

In response to the demand for convenient communication and data exchange, the number of personal computers and the frequency of internet usage have increased steadily. Unfortunately, this growth has also increased the surface area exposed to sponsored and unsponsored hackers seeking to exploit vulnerabilities known to exist in applications and operating systems.

Normally, the motivation for exploitation is persistent access to—and control of—a personal computer by implanting and hiding malicious software, known as malware. Once this is accomplished, the malware is typically programmed to propagate throughout the sub-network which connects the initially infected computer to others. At any stage in this process, the malware almost always performs malicious actions such as accepting commands, instructing computers to carry out various tasks such as returning lists to enumerate processes, files, services, registry keys, etc. Other tasks include modifying, deleting, and sending files to the controller at the remote address. There are many such functions performed by malware. A typical modern malware sample is replete with enough functionality to accomplish almost any task normally associated with the job duties of a professional network administrator.

The networks of government organizations and large companies are vast. Such networks are comprised of an extremely large number of computers, running thousands of software packages. As time goes on and needs evolve, more and more software is introduced across hosts in the network. The surface area of exposure in the collective network increases in a controlled and easily measurable way in proportion to the number of servers added that host services and web sites accessible to users in numerous sub-nets. However, the surface area grows unpredictably in proportion to the number of individual computer users on the network, given their tendencies to respond to suspicious emails, their ill-advised use of the internet, and their decisions to download or install files and software from unscreened, questionable websites. Regardless of whether it is a planned, calculated risk or through the wide variance in human activity, the surface area of exposure to cyber threats is an increasing value, making it a harsh fact of life that malware finds its way onto even the most carefully protected networks.

Despite the pervasiveness of malware, vast controlled networks are also useful as they collectively constitute a very well controlled and precisely defined baseline. Taken together, the files across operating systems form a "whiteware" repository, providing enough files to generate very strong statistics for hundreds of properties associated with files of interest. These properties are called observables. Equally strong statistics may be computed from readily accessible malware repositories existing in both the public and the private domains.

Parent application Ser. No. 13/007,265, now U.S. Pat. No. 8,549,647, primarily discussed portable executable files. The methods described in that application are equally applicable to any computer file, both executable and otherwise. For example, malware may be found inside Adobe Acrobat and compressed Zip files.

Because the majority of computers are Windows based, most malware targets Windows Operating Systems. Although malware must adhere somewhat to Windows file formats, malware samples in the wild are frequently found to contain anomalies in fields and code/data buffers. These aberrations can be used to classify computer files as malware or whiteware.

Traditionally, a primary method which aims to identify malware is signature based malware scanners. Signature based scanners rely on the "signatures" (unique features or data strings) of known malware so that future examples of the same malware can be correctly classified. However, such detectors face a scaling problem in the form of signature proliferation, given the millions of malware variants. Consequently, signature-based detectors necessarily operate with high-maintenance databases requiring updates on a regular basis. These databases are normally extremely bloated, even when signatures are aged out. Moreover, signature-based detectors miss almost all malware files which are not already included in the signature base. This means that almost all malware will evade a signature based scanner on the day they are released.

As just described, a very serious problem with signature-based detectors is that they are inherently almost always out-of-date for new malware threats, and always out-of-date for so-called zero day malware threats. This is generally not a serious problem for individuals and commercial enterprises, as it usually takes time for new malware threats to propagate throughout the Internet. Many organizations, however, such as the military, are often specifically targeted and subject to zero day attacks. They require identifying malware before a specific malware threat has been identified, a signature determined, the signature added to a malware signature database and the new database propagated to computers across the Internet.

Accordingly, there exists a need for an approach devoid of signatures. One prior art method which aims to identify malware is anomaly detectors. Anomaly detectors are built from statistics based on observables belonging only to a repository of whiteware computer files. Anomaly detectors use the statistics from whiteware files in an attempt to identify malware by differences between the malware observables and whiteware statistics. However, when statistics are generated from a repository of uncontaminated whiteware, without any reference to malware, the approach has a high failure rate because there is too much overlap between properties and behaviors of whiteware and malware files.

As such, there exists a need for an approach that uses whiteware statistics like an anomaly detector, but factors in malware statistics as well. Unfortunately, prior art attempts have fallen short in quickly and accurately classifying files using statistical methods. Most prior art is limited by the tradeoff between speed of evaluation and accuracy of results. Some methods sacrifice accuracy for the sake of speed by evaluating only a few computer file observable features (or, simply, observables), thus having high false positive or negative rates. Other methods sacrifice speed for the sake of accuracy by evaluating many computer observables, but causing the evaluation of each file to take a substantial amount of time.

Additionally, while prior art has employed statistical methods based on Bayes Theorem, prior art employs only simple Naïve Bayes calculations or Multi-Naïve Bayes calculations. These calculations employed by prior art consider each computer observable separately from each other computer observable and assume that each observable is independent of all other observables. The Naïve Bayes implementation results in the loss of data which could be used if the true dependent relationship between observables and the full power of Bayes Theorem were harnessed. Accordingly, the Naïve Bayes and Multi-Naïve Bayes approach result in less accurate results.

Accordingly, there exists a need for a computer file classification method and apparatus based on a fully-functional Bayesian Inference Engine which employs statistics based on both malware and whiteware observables and does not use signatures as a method of classifying files.

SUMMARY OF THE INVENTION

The present invention solves these problems by, unlike prior art naïve Bayesian approaches that assume every feature is independent from every other feature, taking advantage of that each iteration of a Bayesian analysis on a PE file observable feature provides an improved initial probability assumption for the next sequential iteration so that, among other advantages, the probability of a PE file being either malware or whiteware can converge to a threshold value, usually quickly, providing much faster determinations with less computational overhead, particularly when scanning a large number of files.

The present invention also adds a significant improvement to this approach by selecting each next observable to be processed by which possible next observable is most closely correlated with the change in probability of the preceding step, providing even faster convergence and less computation overhead.

The present invention considers a large number of observable features of computer files without the necessity of executing any of the instructions within the computer files.

The invention disclosed applies a static, statistical approach combining both whiteware and malware statistics to form a baseline composed of conditional probability tables. When the invention runs live in detection mode, it loads a computer file into memory and computes values for observable features of the file, a sequence of observations. Each observable value is used to look-up counterparts in the malware and whiteware conditional probability tables. The conditional probabilities for a given observable along with the current value which represents the belief about the true nature of the file is then passed to a Bayesian Inference Engine. The engine, in turn, internally invokes Bayes Theorem to update the belief about the true nature of the file and pass that value back to the program. After this process is complete for all observables or the probability regarding the files true nature converges on 0 or 1, adjudication is complete and the file is classified as malware or whiteware dependent on the probability value reached after all iterations of the Bayesian Inference Engine.

According to one example embodiment, an iterative approach is used where Bayes Theorem is invoked once for each observable. In each iteration, the belief the file is malware, P(M), is updated with the result of Bayes Theorem with respect to the instant observable, P(M|O), such that P(M) is set to equal P(M|O) after each iteration. In this way, the result of each iteration is dependent on the results of all prior iterations.

In another example embodiment, the invention evaluates numerous observables. Some observables are skewed toward malware properties (anomalies), while others are skewed toward whiteware properties (standard forms). In one embodiment, the observables are divided into three types and assigned discrete numeric values. Boolean types are assigned a value of 0 or 1, integer types are assigned an integer value, and range types are assigned a numeric value within a given range.

BRIEF DESCRIPTION OF THE DRAWINGS

FIG. 2 illustrates sample instructions for iterative use of Bayes Theorem to evaluate and classify computer files.

DETAILED DESCRIPTION

The invention classifies computer files as malware or whiteware after using Bayes Theorem to evaluate each observable feature of each computer file with respect to other observable features of the same computer file with reference to statistical information gathered from repositories of known whiteware and malware files.

The invention utilizes Bayesian inference to classify computer files. Bayesian Inference is an effect-to-cause method of reasoning over statistics. The base variable is a statistical quantity termed the observable. In the Bayesian context, the observable is a physically measured effect, E. Once in hand, it is then used to update and refine beliefs in one or more possible causes for it. This is stated in the mathematical relation below as Bayes Theorem wherein C is a possible cause for the effect, E; P(C) is the prior probability of cause, C being the cause for the effect, E; P(E|C) is the probability of measuring effect, E conditioned on cause, C being true; P(E) is the marginal probability of effect, E; and P(C|E) is the posterior probability of cause, C after the effect, E is measured.

$$P(C \mid E) = \frac{P(E \mid C)P(C)}{P(E)}$$

In the application of Bayes Theorem utilized by the invention, the effect, E, maps into the computer observable, O: E→O. Additionally, the enumeration for the possible cause, C is: C∈{M,W}, where W=Malware and W=Whiteware. With these assignments, Bayes Theorem is recast in colloquial terms:

$$P(M\mid O) = \frac{P(O\mid M)P(M)}{P(O)}$$

Because a file is either whiteware or malware, but never both, the probability that file is whiteware, P(W) can be expressed as P(W)=1−P(M).

To assure that malware and whiteware conditional probabilities are treated equally and the complementary relationship 1=P(M|O)+P(W|O) is maintained, the special form of Bayes Theorem is used such that $$P(M\mid O) = \frac{1}{1 + \frac{P(O\mid W)}{P(O\mid M)}\frac{(1-P(M))}{P(M)}}$$

Figure 1:
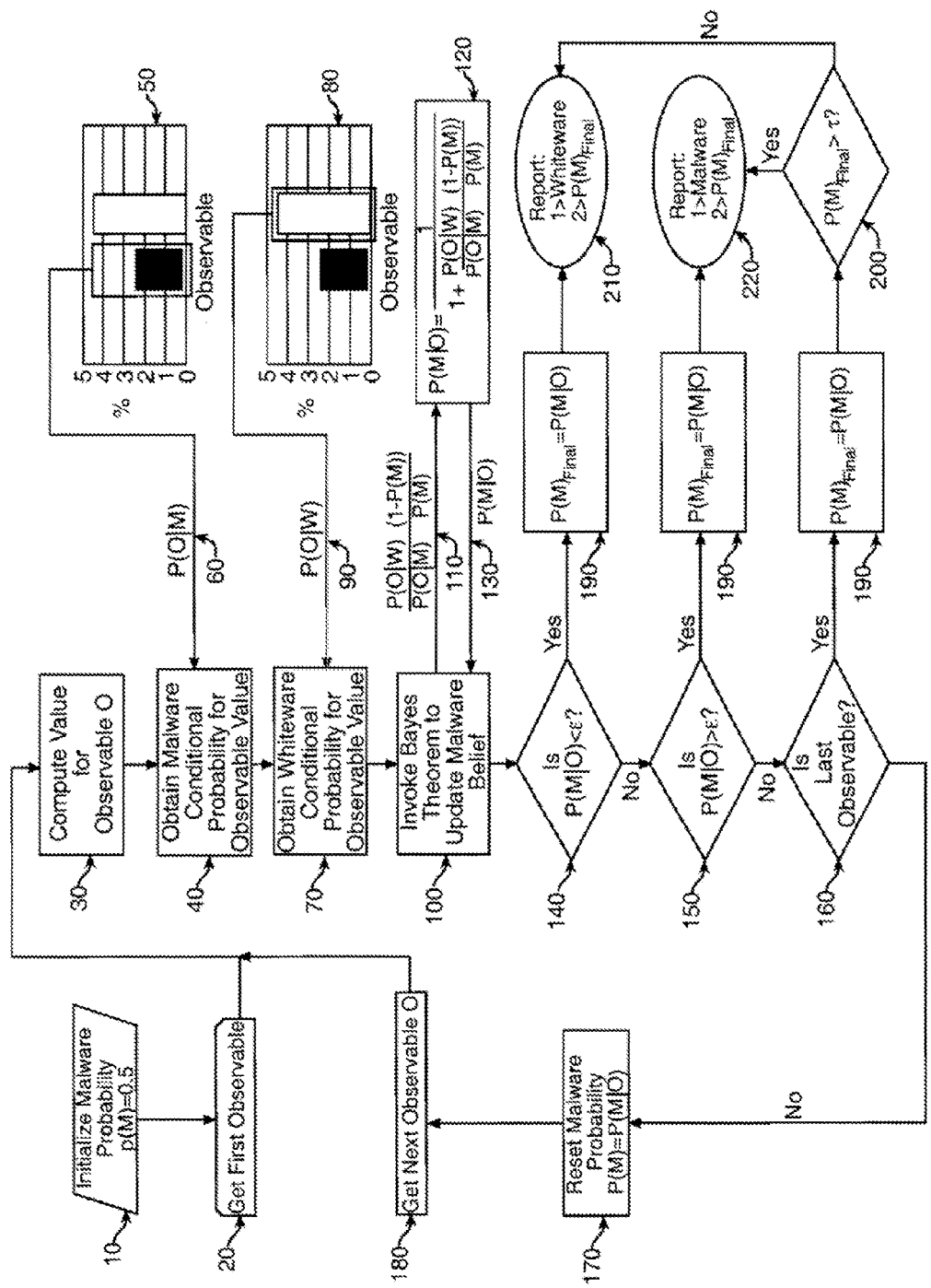
FIG. 1 is a flowchart detailing the method for evaluating and classifying computer files.

The flowchart shown in FIG. 1 illustrates the process for evaluating each computer file. In this example embodiment, the first action is to initialize the malware probability, P(M), to a value of 0.5 10. Since belief equates with probability, this is equivalent to expressing complete neutrality concerning the true disposition of the file before the first iteration begins.

After initialization, the first observable is accessed 20. Those skilled in the art will recognize that observables can be accessed one at a time as needed or all at the same time. Many different tools are available to access observables in computer files such as the Python module, pefile, which provides access to fields and data or code buffers within a computer file through the member classes and structures it initializes.

In this example embodiment of the invention, a numeric value is computed for the first observable 30. The numeric value can be computed in a variety of ways depending on the observable type. In one example embodiment, three observable types are used: Boolean, count and interval.

Boolean type observables are returned as a value of 1 or 0 depending on whether the observable is present or not present respectively. For example, one observable may be whether or not a computer file has a valid security certificate. Files where the certificate is present and valid would be assigned a value of 1 for the observable and those where it was not present or not valid would be assigned a value of 0.

Count type observables are assigned an integer value depending on the specific number of specified features observed. For example, one observable may be how many sections are contained within the computer file. The invention would access the observable, compute the number of sections and return an integer value for the observable.

Interval type observables are assigned any real number in a predetermined interval. A practitioner skilled in the art could compute an interval type observable by evaluating several sub-observables using an equation. Interval type observables could also be features such as the size of the computer file.

After a value is computed for the observable, the process obtains the malware conditional probability 40 by querying a database of probabilities for the various observables in known malware files 50 which returns the value for the malware conditional probability with respect to the instant observable, P(O|M) 60. In some embodiments, calculations are performed after querying the database of probabilities to compute values for observables which are dependent on values of other observables.

The process next obtains the whiteware conditional probability 70 by querying a database of probabilities for the various observables in known whiteware files 80 which returns the value for the whiteware conditional probability with respect to the instant observable, P(O|W) 90. In some embodiments, calculations are performed after querying the database of probabilities to compute values for observables which are dependent on values of other observables.

Those skilled in the art will recognize that the database of probabilities as well as information on observable types can be configured to receive external updates. Accordingly, the disclosed process could maintain accuracy over time despite the changing nature of malware and whiteware files by receiving updated statistical information and observables from a remote source where new statistical data and observables were determined.

After the malware 40 and whiteware 70 conditional probabilities are obtained, the process invokes Bayes Theorem to update the malware belief 100. To do this, the process passes the values for malware probability, P(M), malware conditional probability, P(O|M), and whiteware conditional probability, P(O|W) 110 to a function 120 which utilizes the special form of Bayes Theorem disclosed above to return an updated value for malware probability given the instant observable, P(M|O) 130.

In this example embodiment, the updated value for the malware probability is evaluated with regard to a convergence value, $\epsilon$, after each observable is processed 140 and 150. Generally $\epsilon$ has a very small value such as 0.01. Where P(M|O) is less than $\epsilon$ 140, the process sets P(M)Final equal to the value for P(M|O) 190 and reports the value for P(M)Final and that the file is whiteware 210. Where P(M|O) is greater than 1−$\epsilon$ 150, the process sets P(M)Final equal to the value for P(M|O) 190 and reports the value for P(M)Final and that the file is malware 220. If P(M|O) is not less than $\epsilon$ 140 or greater than 1−$\epsilon$ 150, the process determines whether there are additional observables remaining to evaluate 160. If there are additional observables, the malware probability, P(M), is reset to the value returned by Bayes theorem with respect to the prior observable such that P(M)=P(M|O) 170. Thereafter, the next observable is accessed 180 and the process begins again at step 30.

The above described process repeats until either the malware probability converges with respect to the convergence value, $\epsilon$, at step 140 or step 150 or the last observable is processed 160. If all observables have been processed and the malware probability has not converged with respect to the convergence value, $\epsilon$, then the process sets P(M)Final equal to the last value for P(M|O) 190 and final malware probability, P(M)Final, is evaluated with respect to a threshold value, $\tau$ 200. In one example embodiment, the threshold value is set to 0.7. If the final malware probability, P(M) Final, is less than $\tau$, the process reports the value for P(M)Final and that the file is whiteware 210. Otherwise, the program reports the value for P(M)Final and that the file is malware 220.

FIG. 2 illustrates sample instructions for the described process. Starting with the first instruction, the prior malware belief is initialized: P(M)=0.5 230. After initialization, the algorithm executes the main loop 240. For each observable, the main loop cycles through the steps of solving Bayes Theorem 250 and resetting the prior belief 260. Each pass through the loop constitutes a single iteration. After each iteration, the value is tested against the convergence criteria with regard to the convergence value, $\epsilon$ 270. The main loop iterates until either convergence is reached in step 270 or the last observable is processed. Once the main loop has finished all iterations, the value for P(M)Final is set to the malware belief, P(M), reached during the final iteration of the main loop 280. P(M)Final is the probability that is assigned to the computer file and is used to determine the files ultimate classification as either malware or whiteware.

Figure 3:
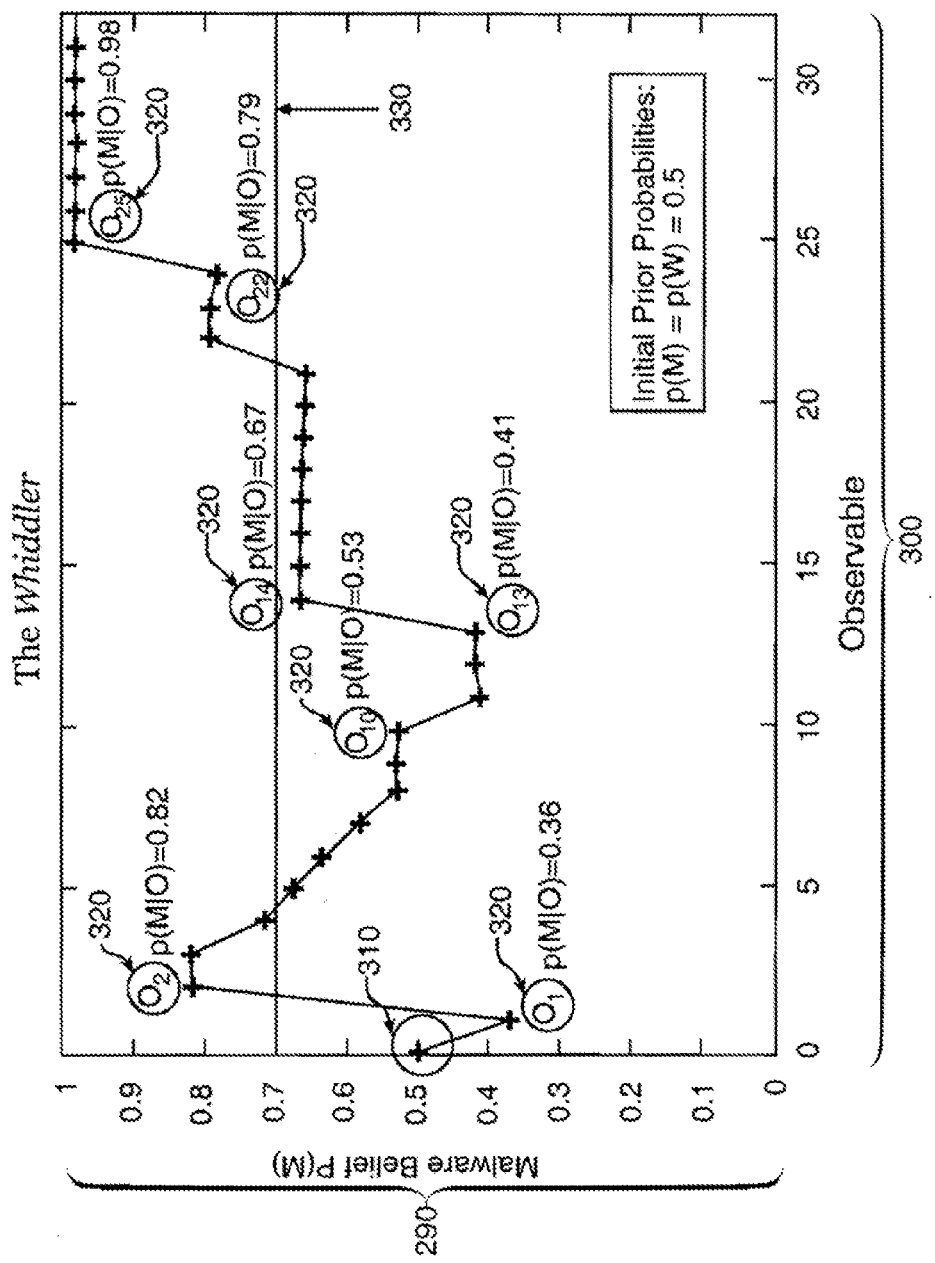
FIG. 3 is a process plot illustrating how the Bayesian Inference Engine iterates to a final belief for a malware sample.

FIG. 3 is a process plot which illustrates how the Bayesian Inference Engine iterates to a final belief for a malware sample. The vertical axis of the plot 290 represents the malware belief, P(M), as it fluctuates within its range of 0 to 1 based on the analysis of the various observables. The horizontal axis of the plot 300 represents the observables analyzed by the invention. The first circle on the left of the plot 310 is set over the initialized malware belief of 0.5. The additional circles 320 indicate selected observables. For this plot, there were 32 observables in all and the main loop in the algorithm was executed 32 times. In FIG. 3, the final malware belief, P(M)Final, is approximately equal to 0.98. The horizontal line crossing the plot at P(M)=0.7 is the threshold, $\tau$ 330, such that any computer file satisfying the relation, P(M) Final$\geq\tau$ is considered malware.

Figure 4:
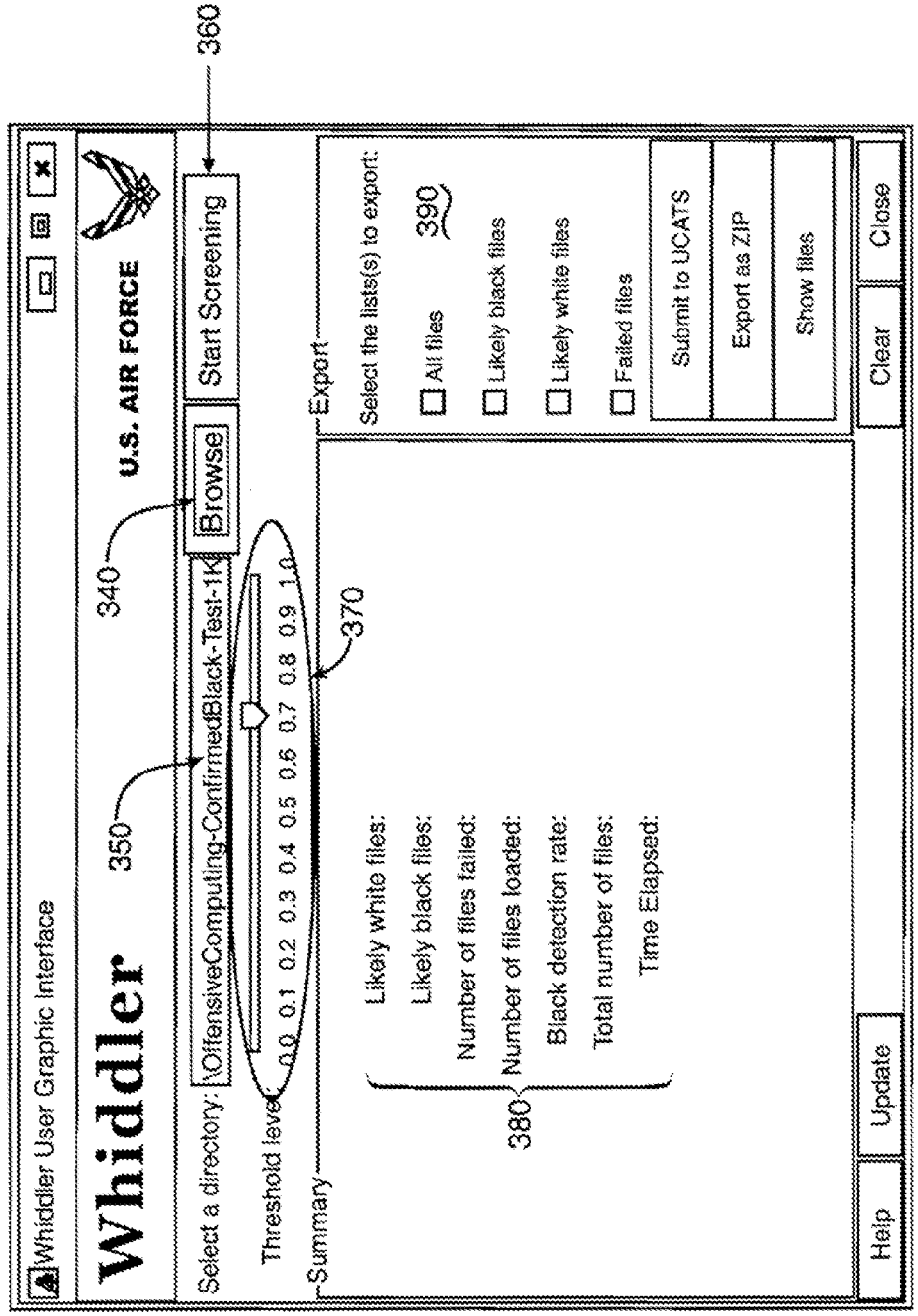
FIG. 4 is a screenshot of the present invention's graphical user interface before any files have been evaluated.
Figure 5:
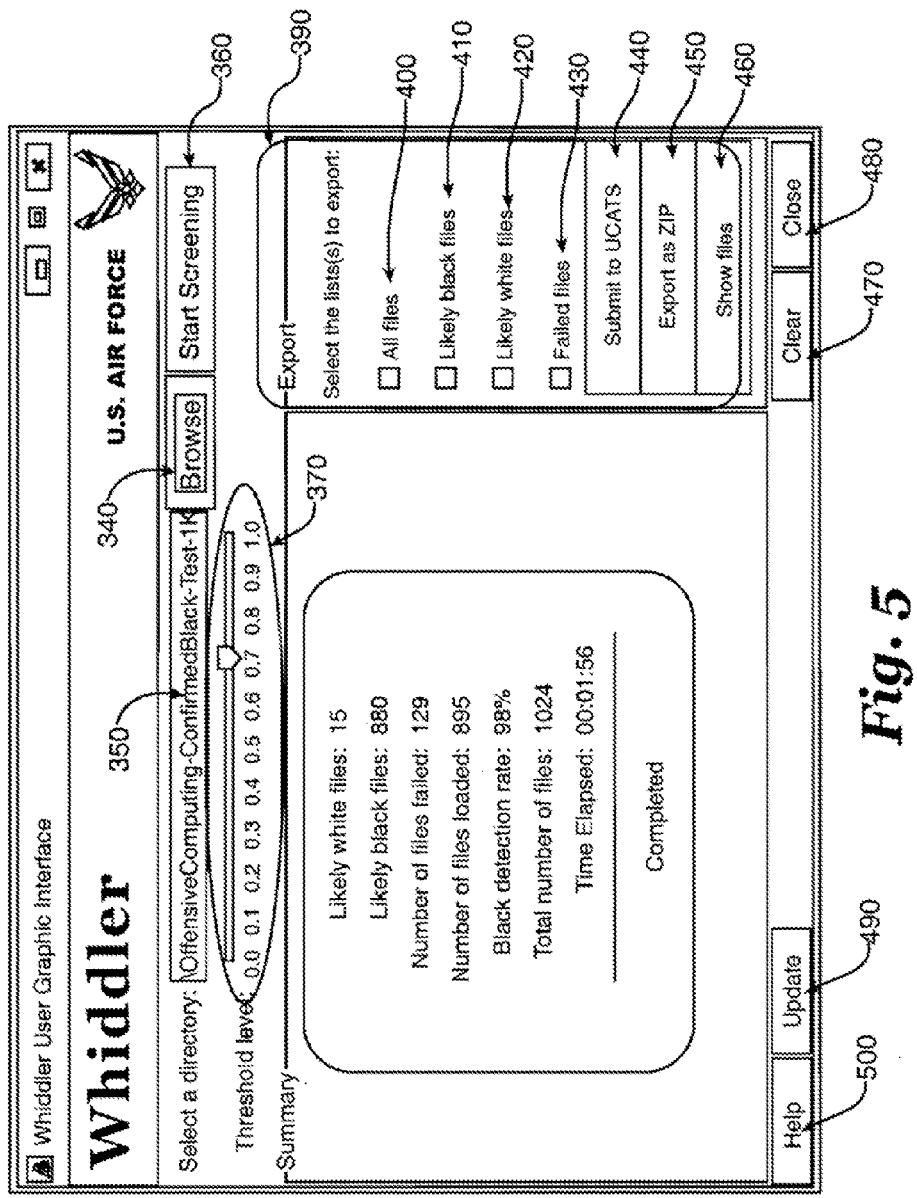
FIG. 5 is a screenshot of the present invention's graphical user interface after all selected files have been evaluated.

FIGS. 4 and 5 illustrate a graphical user interface (GUI) included in one example embodiment. The GUI includes buttons which allow a user to "Browse" 340 the computer file system to select a target directory of files to be evaluated which is displayed in a text box on the GUI once selected 350. Once the directory is chosen, the user can initiate execution of the process by clicking on the "Start Screening" button 360. As explained above, the final belief, P(M)Final is compared to a threshold, $\tau$, which determines the range of probabilities in which a file will be classified as malware or whiteware. The GUI allows a user to adjust the threshold to any value between 0 and 1 370.

As the invention runs, basic statistics for the collection of files are updated in the "Summary" pane 380. After all files have been processed, checkboxes and buttons associated with the "Export" pane 390 become functional. At this point, the user may select a subsequent action to perform on specified file types. The user may choose one or more lists to export. The list choices are all files 400, likely black files 410, likely white files 420, and failed files 430. "All files" 400 indicates all of the files which were part of the user-selected target directory for analysis. "Likely black files" 410 indicates the files which the invention classified as malware. "Likely white files" 420 indicates the files which the invention classified as whiteware. "Failed files" 430 indicates the files which the invention was not able to evaluate, whether because they were of the wrong type, were corrupt, or any other reason. Once a user selects a list or lists of files, the user may elect among three options. One option "Submit to UCATS" 440 allows the user to submit the selected lists of files to the external UCATS triage system for further testing. Another option, "Export as ZIP," 450 allows the user to create a zip file of the files to save for further analysis. Finally, the user may select "Show Files," 460 to display the files in the selected group or groups. The user may also elect to clear the results by clicking the "Clear" button 470, close the window by clicking the "Close" button 480, update the results by clicking the "Update" button 490, or access the programs help menu by clicking the "Help" button 500.

The terminology used in this description is only for the purpose of describing particular embodiments. Unless the context clearly demonstrates otherwise, it is not intended to be limiting. In this specification and in the claims, the singular forms "a," "an" and "the" include plural references unless the context clearly dictates otherwise. Conversely, the claims may be drafted to exclude any optional element or be further limited using exclusive terminology as "solely" "only" and the like in connection with the recitation of claim elements or by use of a "negative" limitation. Any optional feature of the inventive variations described herein may be set forth and claimed independently, or in combination with anyone or more of the described features.

Although the foregoing specific details describe various embodiments of the invention, persons reasonably skilled in the art will recognize that various changes may be made in the details of the apparatus of this invention without departing from the spirit and scope of the invention as defined in the appended claims. Therefore, unless otherwise specified, this invention is not limited to the specific details shown and described.

We claim:

1. A computer-implemented method for classifying a computer file as malware or whiteware, comprising the steps of:
   (a) initializing a malware belief (P(M)) to a predetermined value;
   (b) accessing, using one or more processors, from a database of previously determined observable features, an observable feature from the computer file;
   (c) obtaining a malware conditional probability for the accessed observable feature from a database of predetermined probabilities for malware;
   (d) obtaining a whiteware conditional probability for the accessed observable feature from a database of predetermined probabilities for whiteware;
   (e) applying Bayes theorem to calculate a probability that the computer file is malware given the malware and whiteware conditional probabilities of the accessed observable feature;
   (f) updating the malware belief (P(M)) with a result of Bayes theorem calculated with respect to the accessed observable feature;
   (g) iterating steps (c) through (f) for all previously determined observable features;
   (h) setting the last updated malware belief (P(M)) as a final malware belief (P(M)Final); and,
   (i) evaluating the final malware belief (P(M)Final) to classify the computer file as malware if the final malware belief (P(M)Final) is greater than or equal to a predetermined threshold value, or as whiteware if the final malware belief (P(M)Final) is less than the same predetermined threshold value; and
   (j) evaluating the malware belief (P(M)) after each iteration and ceasing iterating by setting the last updated malware belief (P(M)) as the final malware (P(M)) value if:
      (i) the malware belief (P(M)) is greater than or equal to a predetermined convergence value, wherein the computer file is classified as malware; or,
      (ii) the malware belief (P(M)) is less than the same predetermined convergence value, wherein the computer file is classified as whiteware.

2. The method according to claim 1, where the initial malware belief (P(M)) is set to 0.5 in step (a).

3. The method according to claim 1, where the predetermined threshold value in step (i) is 0.7.

4. The method according to claim 1, further comprising a whiteware belief (P/W), wherein malware belief (P/M) and whiteware belief (P/W) are dependent variables such that (P/M)=1−(P/W).

5. A computer-implemented method for classifying a computer file as malware or whiteware, comprising the steps of:
   (a) initializing a malware belief (P(M)) to a predetermined value;
   (b) accessing, using one or more processors, from a database of previously determined observable features, an observable feature from the computer file;
   (c) obtaining a malware conditional probability for the accessed observable feature from a database of predetermined probabilities for malware;

(d) obtaining a whiteware conditional probability for the accessed observable feature from a database of predetermined probabilities for whiteware;

(e) applying Bayes theorem to calculate a probability that the computer file is malware given the malware and whiteware conditional probabilities of the accessed observable feature;

(f) updating the malware belief (P(M)) with a result of Bayes theorem calculated with respect to the accessed observable feature;

(g) iterating steps (c) through (f) for all previously determined observable features;

(h) setting the last updated malware belief (P(M)) as a final malware belief (P(M)Final);

(i) evaluating the final malware belief (P(M)Final) to classify the computer file as malware if the final malware belief (P(M)Final) is greater than or equal to a predetermined threshold value, or as whiteware if the final malware belief (P(M)Final) is less than the same predetermined threshold value; and, (j) evaluating the malware belief (P(M)) after each iteration and ceasing iterating by setting the last updated malware belief (P(M)) as the final malware (P(M)) value if:
 (i) the malware belief (P(M)) is greater than or equal to a predetermined convergence value, wherein the computer file is classified as malware; or,
 (ii) the malware belief (P(M)) is less than the same predetermined convergence value, wherein the computer file is classified as whiteware.

6. The method according to claim 5, where the predetermined convergence value is 0.01.

7. The method according to claim 5, where the predetermined threshold value is 0.7.

8. A computer-implemented method for classifying a computer file as malware or whiteware, comprising the steps of:

(a) initializing a malware belief (P(M)) to a predetermined value;

(b) accessing, using one or more processors, from a database of previously determined observable features, an observable feature from the computer file;

(c) performing calculations with respect to the accessed observable feature such that the accessed observable feature is assigned a discrete numeric value;

(d) obtaining the malware conditional probability of the discrete numeric value for the accessed observable feature from a database of predetermined probabilities for malware;

(e) obtaining the whiteware conditional probability of the discrete numeric value for the same accessed observable feature from a database of predetermined probabilities for whiteware;

(f) applying Bayes theorem to calculate a probability that the computer file is malware given the malware and whiteware conditional probabilities for the discrete numeric value of the accessed observable feature;

(g) updating the malware belief (P(M)) with a result of Bayes theorem calculated with respect to the accessed observable feature;

(h) iterating steps (b) through (g) for all previously determined observable features;

(i) setting the last updated malware belief (P(M)) as a final malware belief (P(M)Final); and, (j) evaluating the final malware belief (P(M)Final) to classify the computer file as malware if the final malware belief (P(M)Final) is greater than or equal to a predetermined threshold value, or as whiteware if the final malware belief (P(M)Final) is less than the same predetermined threshold value; and (k) evaluating the malware belief (P(M)) after each iteration and ceasing iterating by setting the last updated malware belief (P(M)) as the final malware (P(M)) value if:
 (i) the malware belief (P(M)) is greater than or equal to a predetermined convergence value, wherein the computer file is classified as malware; or,
 (ii) the malware belief (P(M)) is less than the same predetermined convergence value, wherein the computer file is classified as whiteware.

9. The method according to claim 8, where the observable feature types include Boolean, integer, and range such that a Boolean observable feature is assigned a value of 0 or 1, an integer observable feature is assigned an integer value, and a range observable feature is assigned a value within a bounded range.

10. The method according to claim 8, where a value for an observable feature is computed by performing calculations with respect to the values of other observable features.

11. The method according to claim 8, where the initial malware belief (P(M)) is set to 0.5 in step (a).

12. The method according to claim 8 where the predetermined threshold value in step (j) is 0.7.

13. The method according to claim 8, further comprising a whiteware belief (P/W), wherein malware belief (P/M) and whiteware belief (P/W) are dependent variables such that (P/M)=1−(P/W).

14. A computer-implemented method for classifying a computer file as malware or whiteware, comprising the steps of:

(a) initializing a malware belief (P(M)) to a predetermined value;

(b) accessing, using one or more processors, from a database of previously determined observable features, an observable feature from the computer file;

(c) performing calculations with respect to the accessed observable feature such that the accessed observable feature is assigned a discrete numeric value;

(d) obtaining the malware conditional probability of the discrete numeric value for the accessed observable feature from a database of predetermined probabilities for malware;

(e) obtaining the whiteware conditional probability of the discrete numeric value for the same accessed observable feature from a database of predetermined probabilities for whiteware;

(f) applying Bayes theorem to calculate a probability that the computer file is malware given the malware and whiteware conditional probabilities for the discrete numeric value of the accessed observable feature;

(g) updating the malware belief (P(M)) with a result of Bayes theorem calculated with respect to the accessed observable feature;

(h) iterating steps (b) through (g) for all previously determined observable features;

(i) setting the last updated malware belief (P(M)) as a final malware belief (P(M)Final);

(j) evaluating the final malware belief (P(M)Final) to classify the computer file as malware if the final malware belief (P(M)Final) is greater than or equal to a predetermined threshold value, or as whiteware if the final malware belief (P(M)Final) is less than the same predetermined threshold value; and, (k) evaluating the malware belief (P(M)) after each iteration and ceasing iterating by setting the last updated malware belief (P(M)) as the final malware (P(M)) value if:
  (i) the malware belief (P(M)) is greater than or equal to a predetermined convergence value, wherein the computer file is classified as malware; or,
  (ii) the malware belief (P(M)) is less than the same predetermined convergence value, wherein the computer file is classified as whiteware.

15. A computer-implemented method for classifying a computer file as malware or whiteware, comprising the steps of:
  (a) initializing a malware belief (P(M)) to a predetermined value;
  (b) accessing, using one or more processors, from a database of previously determined observable features, an observable feature from the computer file;
  (c) performing calculations with respect to the observable feature such that the observable feature is assigned a discrete numeric value;
  (d) obtaining the malware conditional probability of the discrete numeric value for the accessed observable feature from a database of predetermined probabilities;
  (e) obtaining the whiteware conditional probability of the discrete numeric value for the same accessed observable feature from a database of predetermined probabilities;
  (f) applying Bayes theorem to calculate a probability that the computer file is malware given the malware and whiteware conditional probabilities for the discrete numeric value of the accessed observable feature;
  (g) updating the malware belief (P(M)) with a result of Bayes theorem calculated with respect to the accessed observable feature;
  (h) iterating steps (b) through (g) for all previously determined observable features;
  (i) setting the last updated malware belief (P(M)) as a final malware belief (P(M)Final); and,
  (j) evaluating the malware belief (P(M)) after each iteration and ceasing iterating by setting the last updated malware belief (P(M)) as the final malware (P(M)) value if:
    (A) the malware belief (P(M)) is greater than or equal to a predetermined convergence value, wherein the computer file is classified as malware; or,
    (B) the malware belief (P(M)) is less than the same predetermined convergence value, wherein the computer file is classified as whiteware.

16. The method according to claim 15, where the predetermined convergence value is 0.01.

17. The method according to claim 15, where the predetermined threshold value is 0.7.

18. The method according to claim 15, further comprising a whiteware belief (P/W), wherein malware belief (P/M) and whiteware belief (P/W) are dependent variables such that (P/M)=1−(P/W).

* * * * *